US010781857B2

(12) United States Patent
Sishtla et al.

(10) Patent No.: US 10,781,857 B2
(45) Date of Patent: Sep. 22, 2020

(54) HYBRID BEARINGS

(71) Applicant: Carrier Corporation, Palm Beach Gardens, FL (US)

(72) Inventors: Vishnu M. Sishtla, Manlius, NY (US); Ulf J. Jonsson, South Windsor, CT (US); Zaffir A. Chaudhry, South Glastonbury, CT (US)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

(21) Appl. No.: 16/339,116

(22) PCT Filed: Aug. 31, 2017

(86) PCT No.: PCT/US2017/049585
§ 371 (c)(1),
(2) Date: Apr. 3, 2019

(87) PCT Pub. No.: WO2018/089090
PCT Pub. Date: May 17, 2018

(65) Prior Publication Data
US 2020/0040942 A1    Feb. 6, 2020

Related U.S. Application Data

(60) Provisional application No. 62/419,052, filed on Nov. 8, 2016.

(51) Int. Cl.
*F16C 33/62*    (2006.01)
*F16C 33/30*    (2006.01)
(Continued)

(52) U.S. Cl.
CPC .......... *F16C 33/303* (2013.01); *F16C 19/163* (2013.01); *F16C 33/62* (2013.01); *F16C 33/3856* (2013.01); *F16C 2204/60* (2013.01)

(58) Field of Classification Search
CPC ...... F16C 19/163; F16C 33/62; F16C 33/303; F16C 2204/72; F16C 2206/04; F16C 2206/82; F16C 2223/60; F16C 2362/52
See application file for complete search history.

(56) References Cited

U.S. PATENT DOCUMENTS 6,481,898 B1    11/2002    Yakura et al.
6,828,041 B2    12/2004    Ueda et al.
(Continued)

FOREIGN PATENT DOCUMENTS

DE    102010008650 A1    2/2011
DE    102010012473 A1    9/2011
(Continued)

OTHER PUBLICATIONS

AISI 52100 Chrome Steel Data Sheet, dated Jan. 29, 2015, Simply Bearings Ltd., Lancashire, Great Britain.
(Continued)

*Primary Examiner* — Phillip A Johnson
(74) *Attorney, Agent, or Firm* — Bachman & LaPointe, PC

(57) ABSTRACT

A bearing (20; 150; 152) comprises: an inner race (26); an outer race (28); and a plurality of rolling elements (30). The inner race comprises a nitrogen-alloyed steel (40). The outer race comprises a steel (42) with lower nitrogen content than said nitrogen-alloyed steel.

20 Claims, 3 Drawing Sheets

(51) Int. Cl.
*F16C 19/16* (2006.01)
*F16C 33/38* (2006.01)

(56) References Cited

U.S. PATENT DOCUMENTS

| | | |
|---|---|---|
| 6,869,222 B1 | 3/2005 | Okita et al. |
| 7,172,343 B2 | 2/2007 | Kinno et al. |
| 7,427,162 B2 | 9/2008 | Kano et al. |
| 8,123,412 B2 | 2/2012 | Koci |
| 8,485,730 B2 | 7/2013 | Morishita et al. |
| 8,875,380 B2 | 11/2014 | Weeber et al. |
| 9,051,653 B2 | 6/2015 | Tsutsui et al. |
| 2003/0123770 A1 | 7/2003 | Fujita et al. |
| 2004/0116242 A1 | 6/2004 | Uchiyama et al. |
| 2004/0179761 A1 | 9/2004 | Ohki et al. |
| 2005/0047694 A1 | 3/2005 | Nozaki et al. |
| 2005/0213860 A1* | 9/2005 | Zhou .............. F16C 33/303 384/492 |
| 2007/0133914 A1* | 6/2007 | Matsuyama ......... F16C 19/163 384/470 |
| 2007/0151633 A1 | 7/2007 | Ohki et al. |
| 2012/0177527 A1* | 7/2012 | Kerrigan .................. C21D 9/38 419/29 |
| 2013/0343690 A1* | 12/2013 | Kobayashi .............. F16C 19/26 384/569 |
| 2014/0360210 A1* | 12/2014 | Lapp ...................... F25B 1/053 62/84 |
| 2014/0363115 A1 | 12/2014 | Yamada et al. |
| 2015/0023623 A1 | 1/2015 | Beswick et al. |
| 2015/0260225 A1* | 9/2015 | Habibvand ............. F16C 33/36 384/568 |

FOREIGN PATENT DOCUMENTS

| | | |
|---|---|---|
| DE | 102011082905 A1 | 3/2013 |
| EP | 1710458 A1 | 10/2006 |
| EP | 1715072 A1 | 10/2006 |
| EP | 1770290 A1 | 4/2007 |
| EP | 1770292 A1 | 4/2007 |
| GB | 2326645 A | 12/1998 |
| JP | 2003301849 A | 10/2003 |
| JP | 2004353746 A | 12/2004 |
| WO | 2016/083335 A1 | 6/2016 |
| WO | 2016/160873 A1 | 10/2016 |

OTHER PUBLICATIONS

Stefano Pini et al., Evaluation of DLC, WC/C, and TiN Coatings on Martensitic Stainless Steel and Yttria-Stabilized Tetragonal Zirconia Polycrystal Substrates for Reusable Surgical Scalpels, Apr. 2013, Hindawi Publishing Corporation, ISRN Ceramics, London, Great Britain.
Bohler N360 ISO Extra, Oct. 2003, Bohler Edelstahl GmbH & Co KG, Kapfenberg, Austria.
XD15NW-X40CrMoVN16-2, A High Hardness, Corrosion and Fatigue Resistance Martensitic Grade, Mar. 2010, Aubert&Duval, Paris, France.
Data Sheet Cronidur 30, Jan. 2012, Energietechnik Essen, Essen, Germany.
Technical Data Sheet, Hybrid Bearings with Super-Tough Stainless Steel Rings-the basics, Dec. 2010, SKF Group, Gothenburg, Sweden.
Press Releases, NSK Develops Inner Race DLC-Coated Cylindrical Roller Bearing for High-Efficiency Turbo Chillers Used in Large-scale Air Conditioners, Apr. 15, 2015, NSK Ltd. Shinagawa, Tokyo, Japan.
"Pure refrigerant lubricated bearings from SKF", Mar. 2015, SKF Group, Gothenburg, Sweden.
"Diamond-Like Carbon", Apr. 28, 2004, New Hampshire Ball Bearings, Inc. Chatsworth, California.
Gary L. Doll et al., Technical Paper, "Wear-Resistant Bearings", May 2010, Timken, North Canton, Ohio.
International Search Report and Written Opinion dated Oct. 27, 2017 for PCT/US2017/049585.

\* cited by examiner

HYBRID BEARINGS

CROSS-REFERENCE TO RELATED APPLICATION

Benefit is claimed of U.S. Patent Application No. 62/419,052, filed Nov. 8, 2016, and entitled "Hybrid Bearings", the disclosure of which is incorporated by reference herein in its entirety as if set forth at length.

BACKGROUND

The disclosure relates to hybrid bearings. More particularly, the disclosure relates to hybrid bearings in oil-free refrigeration compressors.

Exemplary state of the art bearings used in oil-free compressors are ceramic hybrid bearings featuring silicon nitride ($Si_3N_4$) balls and nitrogen-alloyed steel races. One commercial example of such a bearing is sold by The Barden Corporation (Danbury, Conn., USA, a division of Schaeffler Group USA) and features Cronidur 30 (trademark of Energietechnik Essen GmbH, Essen, Germany) steel races. Another commercial example is sold by SKF Group (Goteborg, Sweden) under the trademark VC444 and features N360 (trademark of Bohler-Uddeholm Corporation, part of the voestalpine Group, Linz, Austria) steel races. Another nitrogen-alloyed bearing steel is sold by Aubert & Duval (Paris and Les Ancizes, France) under the trademark XD15NW.

One recently-proposed oil-free compressor is found in PCT/US2016/024826, filed Mar. 30, 2016.

SUMMARY

One aspect of the disclosure involves a bearing comprising: an inner race; an outer race; and a plurality of rolling elements. The inner race comprises a nitrogen-alloyed steel. The outer race comprises a steel with lower nitrogen content than said nitrogen-alloyed steel.

In one or more embodiments of any of the foregoing embodiments, the outer race has a coating on the steel.

Another aspect of the disclosure involves a bearing comprising: an inner race; an outer race; and a plurality of rolling elements. The inner race comprises a steel. The outer race comprises a steel with a coating along a track, the coating not being along a track of the inner race.

In one or more embodiments of any of the foregoing embodiments, the outer race coating comprises DLC.

In one or more embodiments of any of the foregoing embodiments, the DLC coating is a tungsten carbide/carbon (WC/C) coating.

In one or more embodiments of any of the foregoing embodiments, the rolling elements are ceramic.

In one or more embodiments of any of the foregoing embodiments, the rolling elements are at least 50.0 weight percent $Si_3N_4$.

In one or more embodiments of any of the foregoing embodiments, the rolling elements are balls.

In one or more embodiments of any of the foregoing embodiments, the inner race is uncoated.

In one or more embodiments of any of the foregoing embodiments, a cage retains the rolling elements.

In one or more embodiments of any of the foregoing embodiments, the bearing is a radial/thrust bearing.

In one or more embodiments of any of the foregoing embodiments, the outer race steel has at least 0.10 wt % lower nitrogen content than the nitrogen-alloyed steel.

In one or more embodiments of any of the foregoing embodiments, the outer race steel has at least 5.0 wt % lower chromium content than the nitrogen-alloyed steel.

In one or more embodiments of any of the foregoing embodiments, the outer race steel has at least 0.2 wt % higher carbon content than the nitrogen-alloyed steel.

In one or more embodiments of any of the foregoing embodiments, a compressor comprises the bearing of any previous claim.

In one or more embodiments of any of the foregoing embodiments, the compressor is a centrifugal compressor having: a housing; and an impeller within the housing.

In one or more embodiments of any of the foregoing embodiments, the compressor further comprises a motor within the housing, the bearing supporting a rotor of the motor.

In one or more embodiments of any of the foregoing embodiments, a vapor compression system comprises the compressor.

In one or more embodiments of any of the foregoing embodiments, a method for manufacturing the bearing comprises applying the coating by CVD or PVD.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
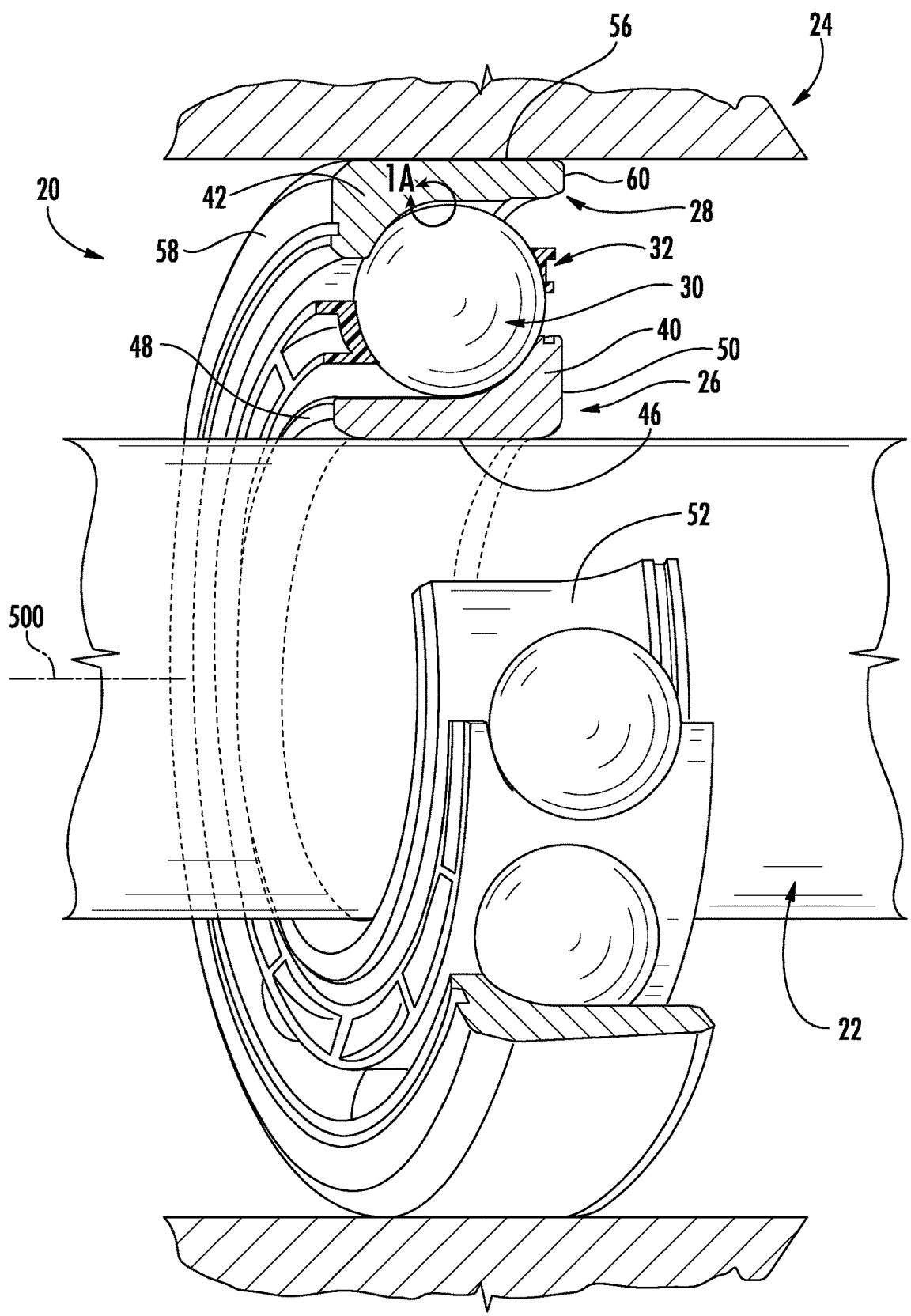
FIG. 1 is a cutaway view of a ball bearing in a machine.

FIG. 1 shows a bearing 20 mounting a first structure 22 (e.g., a shaft) to a second structure 24 (e.g., a fixed structure such as a housing of a machine such as a compressor) for relative rotation about an axis 500.

The bearing is a rolling element bearing having an inner race 26 mounted to the shaft 22, an outer race 28 mounted to the fixed structure 24, and a circumferential array of rolling elements 30 between the inner race and the outer race. Exemplary rolling elements are balls. Alternative rolling elements are rollers. Exemplary rolling elements are ceramic elements. Exemplary rolling elements are majority ceramic or consist essentially of the ceramic (e.g., at least 90% or 99% by weight). Exemplary ceramic is silicon nitride ($Si_3N_4$). The exemplary bearing 20 also includes a cage or retainer 32 for holding the rolling elements in a circumferentially spaced-apart condition. The exemplary cages are molded plastics such as polyetheretherketone (PEEK).

Figure 1A:
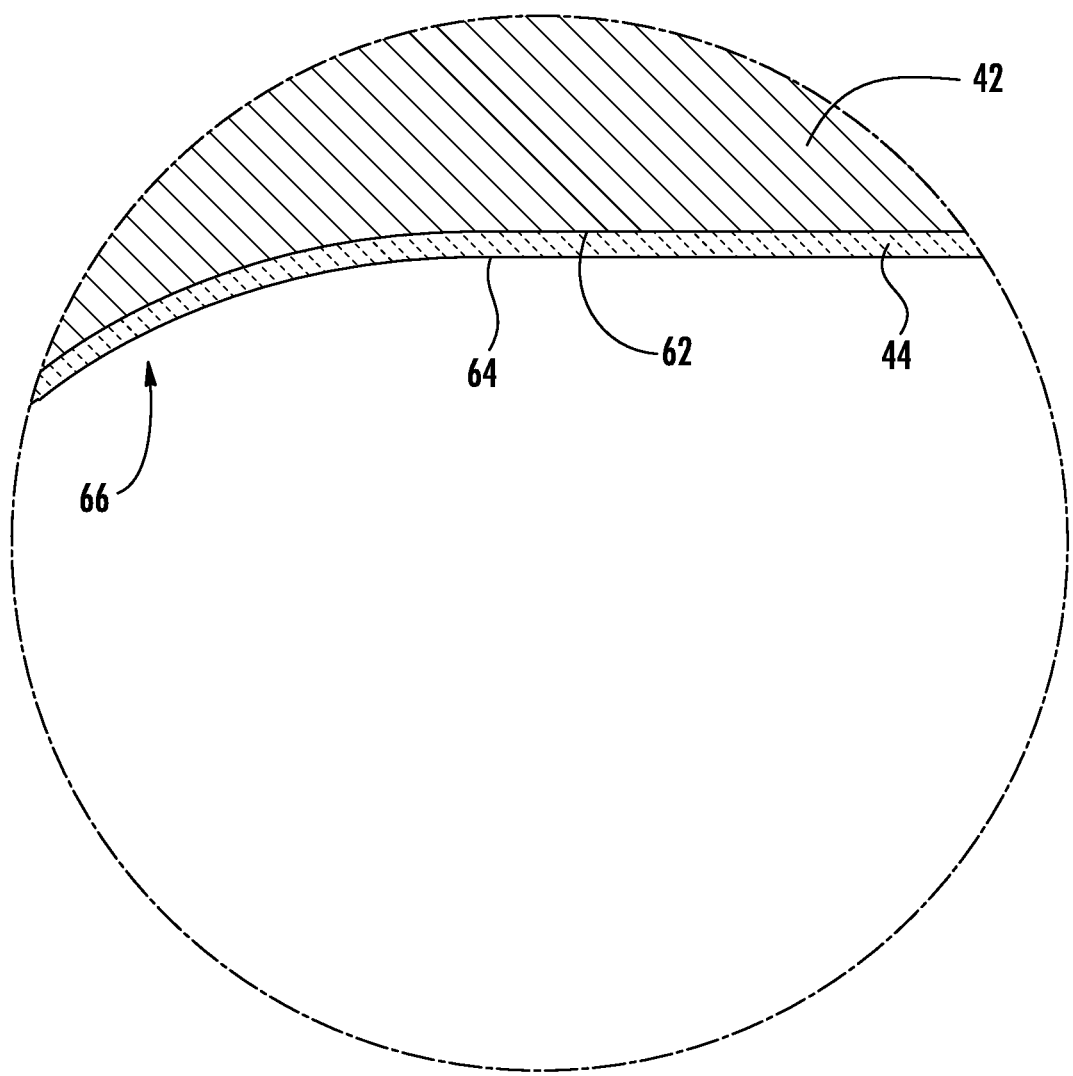
FIG. 1A is an enlarged view of the bearing of FIG. 1.

The bearing 20 exploits compositional asymmetries between the inner race and the outer race. The exemplary embodiment has two asymmetries: the inner race comprising a more expensive material than the outer race; and the inner race being uncoated while the outer race is coated. Thus, the exemplary inner race consists essentially of a metallic substrate 40 and the outer race consists essentially of a substrate 42 and a coating 44 (FIG. 1A). The inner race (and thus its substrate 40) has an inner diameter (ID) surface 46 mounted to the shaft 22 (e.g., in a press-fit, a keyed mounting, a clamped mounting, or the like), first 48 and second 50 end surfaces, and an outer diameter (OD) surface 52 contacting the rolling elements.

The outer race (and thus its substrate 42) has an outer diameter (OD) surface 56 mounted to the housing 24 (e.g., in a press-fit, a set-screw mounting, or the like) and first 58 and second 60 end surfaces. The substrate 42 has an inner diameter (ID) surface 62 (FIG. 1A) bearing the coating 44, with an exposed surface 64 of the coating at least locally (at least along a bearing track portion of the outer race ID surface) forming an inner diameter (ID) surface 66 of the outer race contacting the rolling elements.

The smaller diameter of the inner race OD surface relative to the outer race ID surface means the inner race will be subject to higher unit loading than the outer race and that the inner race will be the life determining one of the two races (other considerations equal). The relatively lower loading of the outer race allows for use of less expensive outer race materials in combination with inner race of nitrogen alloyed steel. The nitrogen alloyed steel may be generally characterized as a martensitic nitrogen stainless steel comprising 10-20 wt. % chromium and 0.1-1.0 wt. % nitrogen. Examples are given in Table I below.

TABLE I

Inner Race Alloys
(elements in weight percent)

| Element | Ex. 1 Cronidur 30 | Ex. 2 N360 | Ex. 3 | Ex. 4 XD15NW | Range 1 | Range 2 |
|---|---|---|---|---|---|---|
| Fe | Balance | Balance | Balance | Balance | Balance | Balance |
| Cr | 14.00-16.00 | 15.00 | 14.50-15.50 | 15.0-16.5 | 10.0-25.0 | 12.0-18.0 |
| C | 0.25-0.35 | 0.30 | 0.25 0.35 | 0.37-0.45 | 0.2-1.5 | 0.2-1.0 |
| Mn | ≤1.00 | 0.40 | | ≤0.6 | ≤2.0 | ≤1.5 |
| Si | ≤1.00 | 0.60 | 0.50-0.60 | <0.6 | ≤2.0 | <1.5 |
| N | 0.30-0.50 | 0.40 | 0.35-0.45 | 0.16-0.25 | 0.1-1.0 | 0.2-0.6 |
| Mo | 0.85-1.10 | 1.00 | 0.95-1.05 | 1.5-1.9 | 0.5-2.5 | 0.6-2.0 |
| Ni | ≤0.50 | | | ≤0.3 | ≤1.0 | ≤1.0 |
| V | | | | 0.2-0.4 | ≤1.0 | <1.0 |

In exemplary Range 1 and Range 2, exemplary wt. % contents of listed elements for which no value is given are ≤5.0 each and exemplary contents of unlisted elements for which no value is given are ≤5.0 each and exemplary totals are ≤15.0 or ≤10.0 or ≤5.0.

The outer race may comprise a substrate of a less expensive steel than the inner race and a coating. Diamond-like-carbon (DLC) is an exemplary coating and exists in several forms including doped variants and layered variants like tungsten-containing diamond like carbon coating (W-DLC, also known as tungsten carbon carbide (WCC) or tungsten carbide/carbon (WC/C)). Although the inner race may also be coated, the benefit may be less and thus an uncoated variants are the main examples.

Exemplary outer race steel compositions are conventional ball bearing chrome steels such as those shown in Table II:

TABLE II

Outer Race Alloys
(elements in weight percent)

| Element | Ex. 1 AISI 52100 | Ex. 2 AISI M50 | Ex 3 AISI 440C | Range 1 | Range 2 |
|---|---|---|---|---|---|
| Fe | Balance | Balance | Balance | Balance | Balance |
| Cr | 1.30-1.60 | 3.75-4.25 | 17.0 | 1.0-5.0 | 5.0-20.0 |
| C | 0.980-1.10 | 0.77-0.85 | 1.1 | 0.4-1.5 | 0.5-2.0 |
| Mn | 0.250-0.450 | ≤0.350 | 1.0 | 0.1-1.5 | 0.1-2.0 |
| Si | 0.150-0.300 | ≤0.250 | 1.0 | 0.1-1.5 | 0.1-2.0 |
| S | ≤0.0250 | ≤0.015 | | | |
| P | ≤0.0250 | ≤0.015 | | | |
| Co | | ≤0.250 | | | |
| Cu | | ≤0.100 | | | |
| Mo | | 4.0-4.5 | 0.75 | | ≤8.0 |
| Ni | | ≤0.15 | | | |
| W | | ≤0.25 | | | |
| V | | 0.90-1.10 | | | |

In exemplary Range 1 (conventional bearing steel) and Range 2 (stainless steel), exemplary wt. % contents of listed elements for which no value is given are ≤5.0 each or ≤3.0 or ≤2.0 or ≤1.0 and exemplary contents of unlisted elements for which no value is given are ≤5.0 or ≤3.0 or ≤2.0 or ≤1.0 each and exemplary totals are ≤15.0 or ≤10.0 or ≤5.0. More particularly, for nitrogen exemplary contents are ≤0.5% or ≤0.2% or ≤0.1 or essentially nitrogen-free.

Exemplary outer race manufacture comprises: machining of the race in a soft state; heat treatment to obtain the desired hardness; grinding to final dimensions; surface finishing; and applying the DLC coating. The DLC coating can be applied using several established processes, Exemplary processes are plasma-assisted chemical vapor deposition (PACVD) and physical vapor deposition (PVD). Exemplary coating is to a total depth of 0.1 micrometer to 10.0 micrometer, more particularly, 1.0 micrometer to 3.0 micrometer, at least locally along a portion of the bearing track.

Thus, in typical combinations, the inner race substrate will have: one to all of: higher nitrogen than the outer race (e.g., at least 0.10 wt. % greater or at least 0.30 wt. % greater); higher chromium (e.g., at least 5.0 wt. % greater or at least 10.0 wt. % greater); and/or lower carbon (e.g., less than 0.5% and/or a difference of at least 0.2% or at least 0.5%.). The higher chromium content imparts corrosion resistance and, wear resistance.

Figure 2:
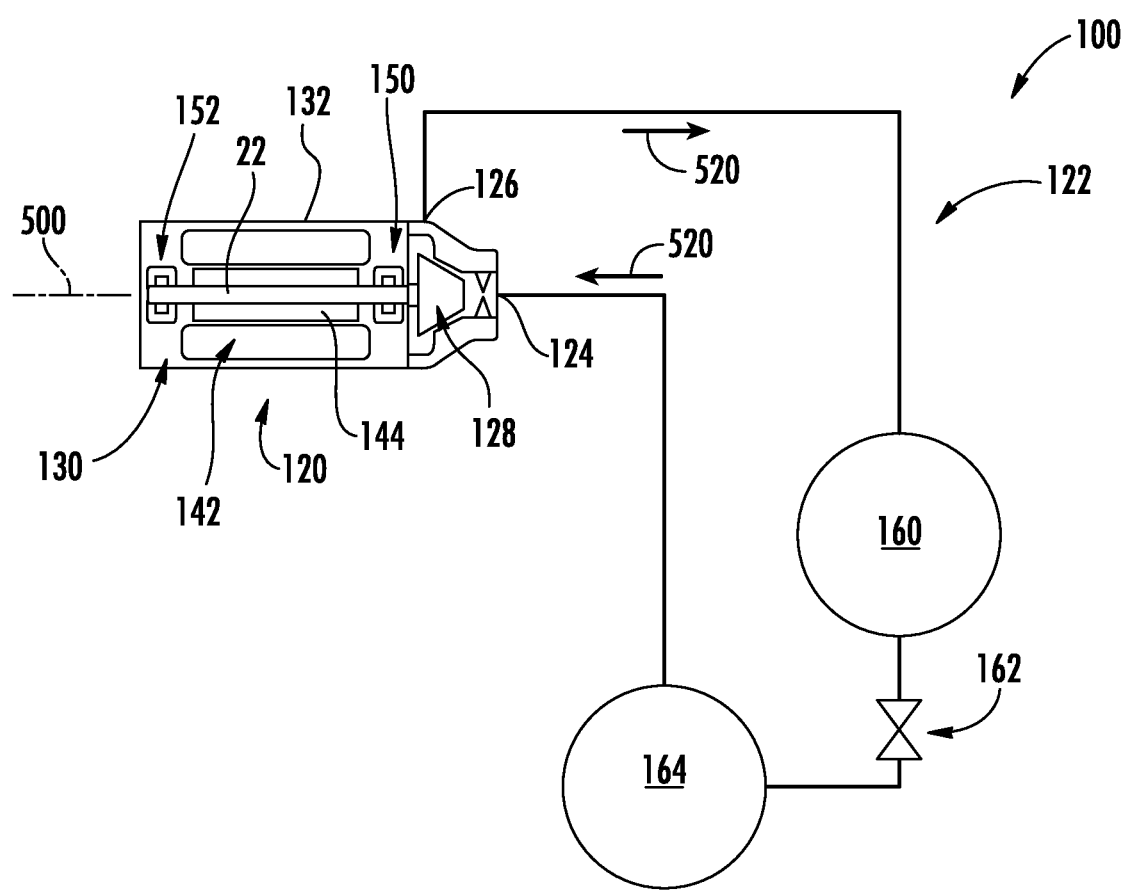
FIG. 2 is a schematic view of a vapor compression system having a compressor including the bearing of FIG. 1.

FIG. 2 shows a basic vapor compression system 100 wherein, in at least the illustrated mode, a compressor 120 drives a refrigerant flow 520 along a flowpath or loop 122 entering the compressor at a suction port or inlet 124 and exiting the compressor at a discharge port or outlet 126. The exemplary illustrated compressor is a centrifugal compressor having an impeller 128 driven by a motor 130. The compressor has a case or housing assembly 132. The housing assembly contains the motor 130 having a stator 142 and a rotor 144. The exemplary rotor is mounted to the shaft 22 described above. One or more bearings 150, 152 support the shaft relative to the housing for rotation about the axis 500.

One or both of the bearings 150, 152 may have the properties described above for the bearing 20. Depending upon implementation, one or both of these bearings may be a thrust bearing and/or a radial bearing. For example, one may be a thrust/radial bearing while the other is a pure radial bearing. Numerous compressor configurations are known in the art or may yet be developed. The exemplary compressor is an oil-free compressor (also known as a refrigerant-lubricated compressor). In such a compressor, the refrigerant may contain very small amounts of oil or other additives but is distinguished from compressors wherein a very large amount of oil is present and wherein only oil or mainly oil is delivered to the bearings. Refrigerant supply lines (not shown) may pass to the bearings from the loop 122 and return lines may return to the loop.

Along the basic loop 122 sequentially downstream from the discharge port 126 are an exemplary first heat exchanger 160, expansion device 162, and second heat exchanger 164. Depending upon the particular use, these heat exchangers may be refrigerant-air heat exchangers, refrigerant-water heat exchangers, or other. An exemplary use of refrigerant-water heat exchangers is a water-cooled chiller. An exemplary mixed situation is an air-cooled chiller. In the normal operational mode shown, the first heat exchanger 160 is a heat rejection heat exchanger and the second heat exchanger 164 is a heat absorption heat exchanger. Examples of the expansion device 162 include electronic expansion valves, thermal expansion valves, orifices, capillary devices, and the like.

Although one basic configuration is shown, many actual commercial implementations are much more complicated with additional pathways for economizers or other hardware and/or to accommodate multiple use modes (e.g., cooling versus heating and various different sub-modes within those two).

The bearings and compressor may be made using otherwise conventional or yet-developed materials and techniques.

Relative to various baseline bearings, various implementations may have one or more of several advantages. A first comparative baseline bearing has inner and outer races of nitrogen alloyed steel, uncoated. One exemplary modification preserves the rolling elements and inner race while replacing the outer race with one described above. This may substantially reduce cost due to the lower cost of outer race material. It also may increase efficiency where the DLC coating provides reduced friction relative to the uncoated baseline.

Further variations include rollers (e.g., cylindrical or tapered) instead of balls as the rolling elements.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing basic system, details of such configuration or its associated use may influence details of particular implementations. Accordingly, other embodiments are within the scope of the following claims.

What is claimed is:

1. A bearing (20; 150; 152) comprising:
an inner race (26);
an outer race (28); and
a plurality of rolling elements (30),
wherein:
the inner race comprises a nitrogen-alloyed steel (40); and
the outer race comprises a steel (42) with lower nitrogen content than said nitrogen-alloyed steel;
the outer race has a coating (44) on the steel;
the rolling elements are ceramic;
the outer race steel has at least 0.10 wt % lower nitrogen content than the nitrogen-alloyed steel;
the outer race steel has at least 5.0 wt % lower chromium content than the nitrogen-alloyed steel;
the outer race steel has at least 0.2 wt % higher carbon content than the nitrogen-alloyed steel; and
the outer race coating comprises DLC.

2. A bearing (20; 150; 152) comprising:
an inner race (26);
an outer race (28); and
a plurality of rolling elements (30),
wherein:
the inner race comprises a steel (40);
the outer race comprises a steel (42) with a coating (44) along a track, the coating not being along a track of the inner race; and
the outer race steel has at least 0.10 wt % lower nitrogen content than the inner race steel.

3. The bearing of claim 2 wherein:
the outer race coating comprises DLC.

4. The bearing of claim 3 wherein:
the DLC coating is a tungsten carbide/carbon (WC/C) coating.

5. The bearing of claim 2 wherein:
the rolling elements are ceramic.

6. The bearing of claim 2 wherein:
the rolling elements are at least 50.0 weight percent $Si_3N_4$.

7. The bearing of claim 2 wherein:
the rolling elements are balls.

8. The bearing of claim 2 wherein:
the inner race is uncoated.

9. The bearing of claim 2 further comprising:
a cage (32) retaining the rolling elements.

10. The bearing of claim 2 being a radial/thrust bearing.

11. The bearing of claim 2 wherein:
the outer race steel has at least 5.0 wt % lower chromium content than the inner race steel.

12. The bearing of claim 2 wherein:
the outer race steel has at least 0.2 wt % higher carbon content than the inner race steel.

13. A compressor (120) comprising the bearing of claim 2.

14. The compressor of claim 13 being a centrifugal compressor having:
a housing (132); and
an impeller (128) within the housing.

15. The compressor of claim 14 further comprising:
a motor (130) within the housing, the bearing supporting a rotor (144) of the motor.

16. A vapor compression system (100) comprising the compressor of claim 15.

17. A method for manufacturing the bearing of claim 2, the method comprising:
applying the coating by CVD or PVD.

18. A bearing (20; 150; 152) comprising:
an inner race (26);
an outer race (28); and
a plurality of rolling elements (30),
wherein:
the inner race comprises a steel (40);
the outer race comprises a steel (42) with a coating (44) along a track, the coating not being along a track of the inner race; and
the outer race steel has at least 5.0 wt % lower chromium content than the inner race steel.

19. The bearing of claim 18 wherein:
the rolling elements are at least 50.0 weight percent $Si_3N_4$.

20. The bearing of claim 18 wherein:
the rolling elements are balls.

* * * * *